United States Patent
Baghboian

(12) 
(10) Patent No.: US 6,494,473 B1
(45) Date of Patent: Dec. 17, 2002

(54) TIRE PROTECTOR

(76) Inventor: Sossy Baghboian, 9516 Oso Ave., Chatsworth, CA (US) 91311

(*) Notice: Subject to any disclaimer, the term of this patent is extended or adjusted under 35 U.S.C. 154(b) by 10 days.

(21) Appl. No.: 09/895,630

(22) Filed: Jul. 2, 2001

Related U.S. Application Data

(63) Continuation-in-part of application No. 09/542,391, filed on Apr. 4, 2000, now abandoned.

(51) Int. Cl.[7] ............................................. B60R 19/00
(52) U.S. Cl. ......................................... 280/160; 70/226
(58) Field of Search ................................ 280/160, 762, 280/770, 847, 152.2, 152.3, 156; 150/166; 301/37.21, 37.25, 37.36; 293/19; 180/287; 70/225, 226

(56) References Cited

U.S. PATENT DOCUMENTS

| | | | | |
|---|---|---|---|---|
| 4,252,169 A | * | 2/1981 | Watts | 152/154 |
| 4,651,849 A | * | 3/1987 | Givati | 180/287 |
| 4,784,440 A | * | 11/1988 | Fair | 118/505 |
| 5,214,944 A | * | 6/1993 | Wolthoff | 188/32 |
| 5,263,770 A | * | 11/1993 | Goudey | 301/108.4 |
| 5,706,682 A | * | 1/1998 | Barker et al. | 188/32 |
| 5,927,108 A | * | 7/1999 | Pierce | 70/19 |
| 6,044,968 A | * | 4/2000 | Iampen | 118/505 |
| 6,045,195 A | * | 4/2000 | Okamoto | 301/37.108 |

* cited by examiner

Primary Examiner—Brian L. Johnson
Assistant Examiner—L. Lum
(74) Attorney, Agent, or Firm—Robert M. Sperry

(57) ABSTRACT

Means for protecting automobile wheels and tires comprising a shield which is stored in a retracted, inconspicuous position under the vehicle fender when the vehicle is in use, but which can be extended to cover and protect the wheel and tire when the vehicle is not being driven.

5 Claims, 3 Drawing Sheets

TIRE PROTECTOR

RELATED CASES

This application is a Continuation-In-Part of U.S. patent application Ser. No. 09/542,391, filed Apr. 4, 2000 and now abandoned.

FIELD OF INVENTION

This invention relates to automobile equipment and is particularly directed to improved means for protecting automobile tires and the like.

PRIOR ART

Automobiles are an essential part of today's living style. Unfortunately, that also makes them prime targets for thieves and vandals. Primary targets for theft and vandalism are the wheels and tires. This has become increasingly true in recent years due to the popularity of expensive chrome or magnesium wheels. Also, one popular form of vandalism is slashing tires. Unfortunately, since the tires are exposed, they are easy targets and little or nothing has been done heretofore to overcome this problem.

BRIEF SUMMARY AND OBJECTS OF INVENTION

These disadvantages of the prior art are overcome with the present invention and means are provided for positively and securely protecting the tires and wheels against theft or vandalism without interfering with normal operation of the vehicle.

The advantages of the present invention are preferably attained by providing a shield which is stored in a retracted, inconspicuous position under the vehicle fender when the vehicle is in use, but which can be extended to cover and protect the wheel and tire when the vehicle is not being driven.

Accordingly, it is an object of the present invention to provide improved means for protecting automobile wheels and tires.

Another object of the present invention is to provide improved means for protecting automobile wheels and tires which can be stored in a retracted, inconspicuous position when the vehicle is in use.

An additional object of the present invention is to provide improved means for protecting automobile tires which, when extended, will fully and positively protect the tires and wheels against theft or vandalism.

A specific object of the present invention is to provide improved means for protecting automobile wheels and tires comprising a shield which is stored in a retracted, inconspicuous position under the vehicle fender when the vehicle is in use, but which can be extended to cover and protect the wheel and tire when the vehicle is not being driven.

These and other objects and features of the present invention will be apparent from the following detailed description, taken with reference to the figures of the accompanying drawing.

DETAILED DESCRIPTION OF THE INVENTION

Figure 1:
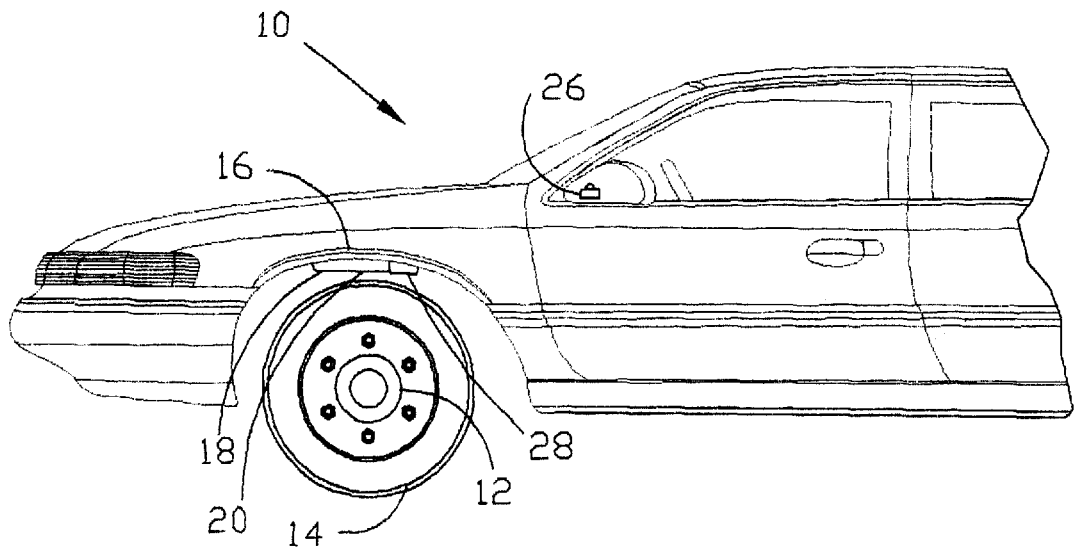
FIG. 1 is a diagrammatic representation, showing an automobile having the wheel protection device of the present invention in the stored position.
Figure 2:
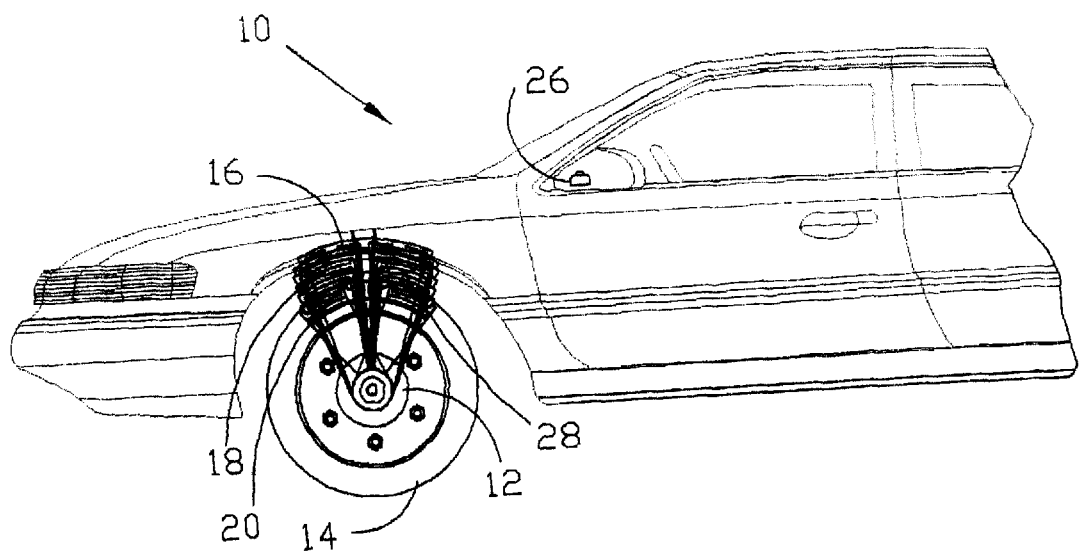
FIG. 2 is a view, similar to that of FIG. 1, showing the wheel protection device of the present invention extended, but not deployed.
Figure 3:
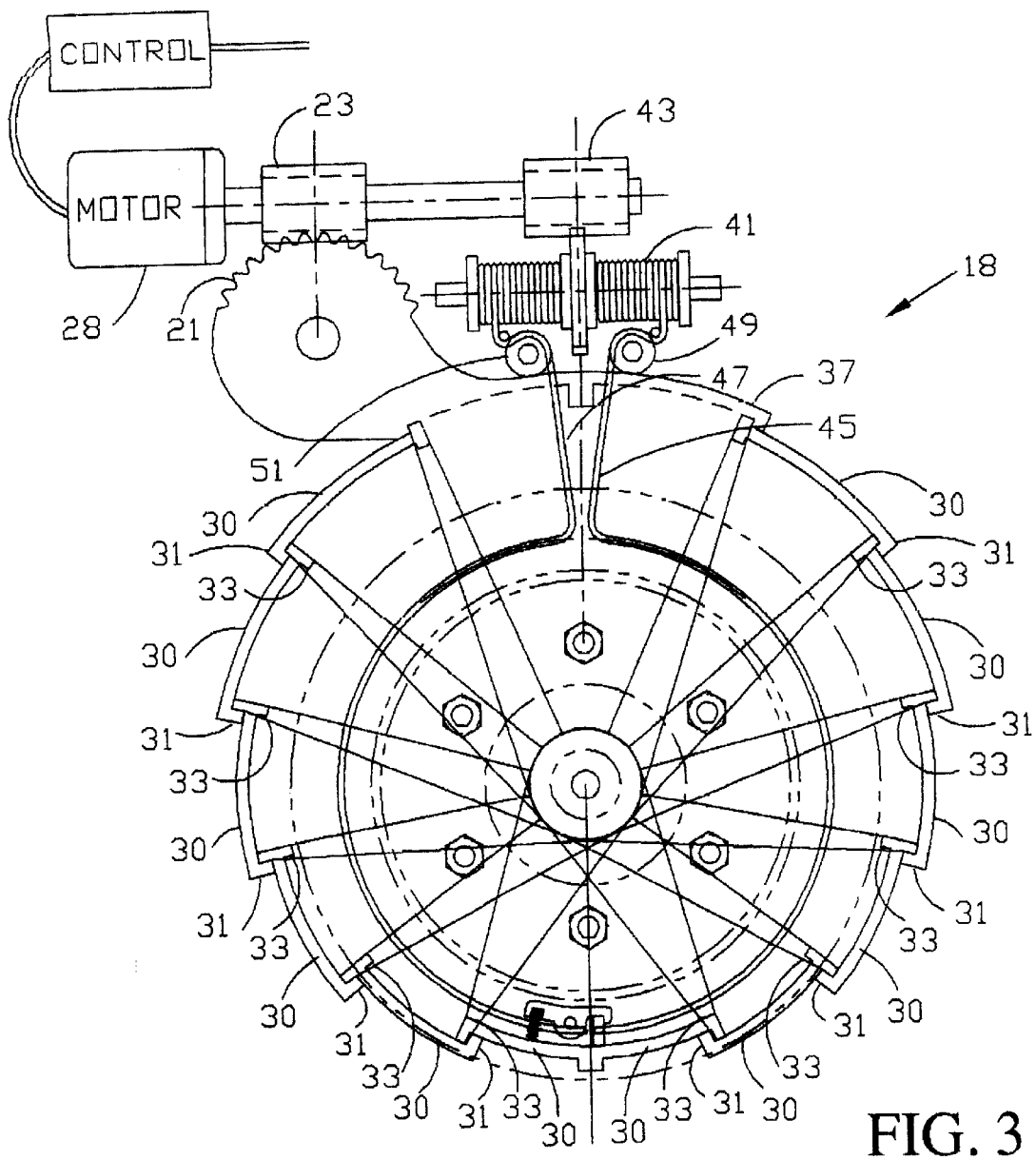
FIG. 3 is a diagrammatic view showing the wheel protector of the present invention in the fully deployed position.
Figure 4:
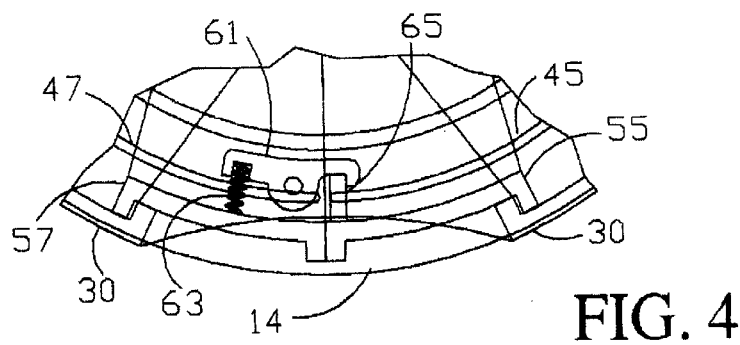
FIG. 4 is a detail view showing the latch mechanism of the wheel protector of FIG. 1.
Figure 5:
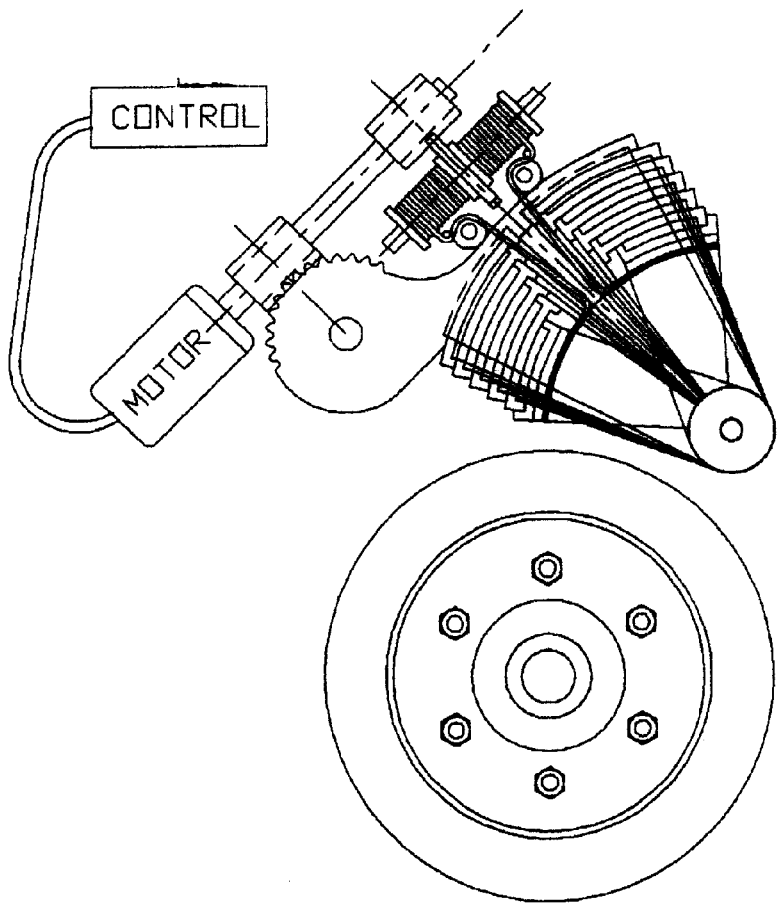
FIG. 5 is a diagrammatic representation showing the wheel protector of the present invention in the stored position.
Figure 6:
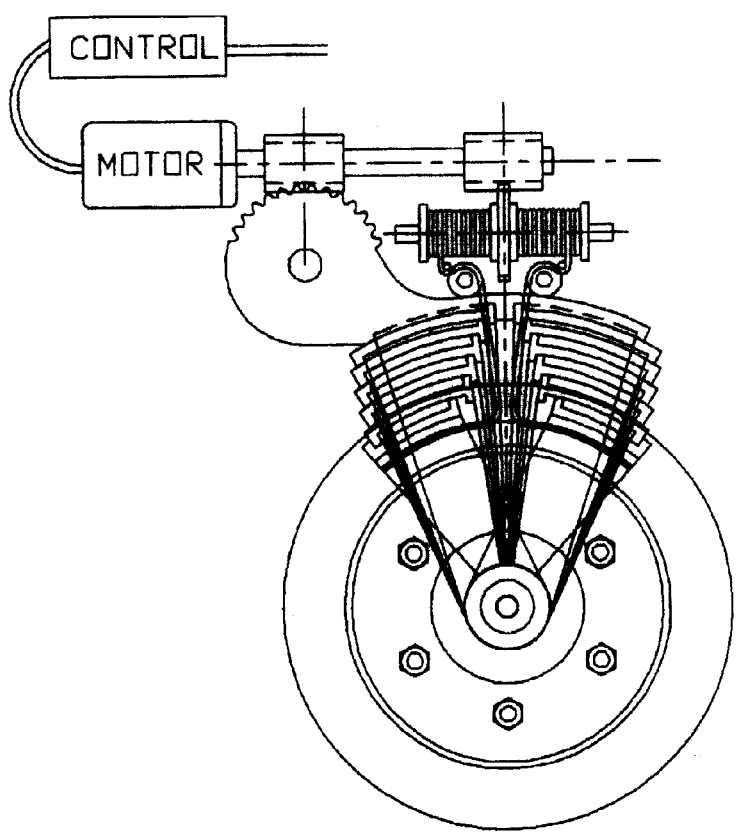
FIG. 6 is a diagrammatic representation showing the wheel protector of the present invention extended but not deployed.

In that form of the present invention chosen for purposes of illustration, FIG. 1 shows an automobile, indicated generally at 10 having a wheel 12 with a tire 14 and having a fender 16 extending above the wheel 12. In accordance with the present invention, a wheel protection device, indicated generally at 18, comprising a box 20 is mounted under the fender 16 above the wheel 12 and contains a protective sheath 22, as seen at 24 in FIG. 2, which is stored in a retracted position, as seen in FIG. 1. The protective sheath 22 is pivotally mounted on a bracket 19 and carries a curved ratchet 21 which is engaged by a worm gear 23 driven by reversible motor 28, as best seen in FIG. 3. With the protective sheath 22, in the retracted position, the automobile 10 an be driven in a normal manner and the protection device 18 will not interfere with the driving, but will remain hidden inconspicuously under the fender 16. When the driver parks and wishes to protect the wheels 12, the driver actuates a switch 26 on the dashboard which actuates a motor 28. This causes worm gear 23 to travel along the curved ratchet 21 and to extend the protective sheath 22 to the position seen in FIG. 2. As best seen in FIG. 3, the protective sheath 22 is formed of metal or other suitable material which will resist stabbing or other attempts to tamper with or remove it and is comprised of a plurality of overlapping and interconnected plates 30, each having a leading edge flange 31 projecting inwardly and a trailing edge flange 33 wghich extends above and below the surface 35 of the plate 30. When not extended, the plates 30 are stored within a housing member 37 which carries the curved ratchet 21 and has inwardly extending flanges 39 procided at each edge. Also, the housing member 37 contains a cable reel 41 which is driven by motor 28 and worm gear 23 through worm gear 43. The cable reel 41 is a double reel and carries twocables 45 and 47 which extend about pulleys 49 and 51, respectively, and pass through openings 53 in the trailing edge flanges 33 of the plates 30 and are attached to the leading edges of the leading plates 55 and 57, as best seen in FIG. 4. As seen in FIG. 3, when the protective sheath 22 extends, it extends about the tire 14 and substantially encloses the tire 14 and wheel 12. This prevents potential vandals or thieves from obtaining access to the tires, wheel covers and lug nuts and, hence, prevents vandalism or theft. The protective sheath 22 comprises a plurality of interconnected plates 30 which overlap each other and which unfold as the sheath 22 is extended to enclose the tire 14 and wheel 12, as seen in FIG. 3. With the sheath 22 in this position, the sheath prevents anyone from gaining access to either the tire 14 or wheel 12 and, thereby prevents vandalism or reverse direction to retract the sheath 22 into the housing member 37 and, hence can have access to the tire 14 and wheel for servicing, changing and the like. When the plates 30 are fully retracted, tension on the cables 45 and 47 will prevent further rotation of cable reel 41 and, hence, of worm gear 43. This causes worm gear 28 to travel off of worm gear 43 to the curved ratchet 21, which causes the protetive sheath 22 to rotate to the stored position, as seen in FIG. 1. When worm gear 28 reaches the end of the curved ratcht 21, it strikes lilmit switch 63 which turns off motor 28 and returns it to the forward polarity theft. As seen in FIG. 4, the outer portions of the leding plates 53 and 55 are recessed, as seen at 59, to allow the car to be towed or pushed, if necessary, but not to permit access to the tires 14 by knives, nails or the like. Also, as seen in FIG. 4, leading plate 57 carries a latch 61 which is urged by spring 63 to project through an opening 65 in the leading edge of plate 55 to latch the plates 55 and 57 together in the fully extended position. When desired, the driver can actuate switch 26 to cause motor 28 to rotate in the reverse direction to retract the sheath 22 into the housing member 37 and, hence, can have access to the tire 14 and wheel for servicing, changing and the like.

Obviously, numerous variations and modifications can be made without departing from the spirit of the present invention. Therefore, it should be clearly understood that the form of the present invention described above and shown in the figures of the accompanying drawing are illustrative only and are not intended to limit the scope of the present invention.

What is claimed is:

1. A wheel protection device comprising:

a storage box attached to a vehicle adjacent a wheel of the vehicle, a plurality of interconnected plates movable between a stored position within said box and an extended position substantially enclosing said wheel, and a motor for driving said plates.

2. The device of claim 1 further comprising:

switch means located within a driver's compartment of said vehicle for controlling said motor.

3. The device of claim 1 wherein:

said plates are formed of tamper-proof material.

4. The device of claim 1 wherein:

said plates are formed of metal.

5. The device of claim 1 wherein:

said plates when extended cover said wheel to prevent access to said wheel.

* * * * *